United States Patent [19]
Casey

[11] Patent Number: 5,991,123
[45] Date of Patent: Nov. 23, 1999

[54] HDD HEAD STACK ASSEMBLY HAVING CONDUCTIVE TRACES SUPPORTED BY THE SIDES OF THE ACTUATOR ARM TO EXTEND IN PLANAR ARRAYS

[75] Inventor: Shawn Casey, San Jose, Calif.

[73] Assignee: Western Digital Corporation, Irvine, Calif.

[21] Appl. No.: 09/102,595

[22] Filed: Jun. 22, 1998

[51] Int. Cl.$^6$ .................................................. G11B 5/48
[52] U.S. Cl. ............................................................ 360/104
[58] Field of Search ..................................... 360/104, 106

[56] References Cited

U.S. PATENT DOCUMENTS

| | | | |
|---|---|---|---|
| 5,644,448 | 7/1997 | Suzuki | 360/106 |
| 5,781,380 | 7/1998 | Berding | 360/104 |

*Primary Examiner*—A. J. Heinz
*Attorney, Agent, or Firm*—Leo J. Young; Milad G. Shara

[57] ABSTRACT

A magnetic disk drive with a head stack assembly includes a body portion, a main flex circuit, an actuator arm cantilevered from the body portion and a head gimbal assembly supported at the actuator arm. The actuator arm includes a proximal end and a distal end, a first side surface and a second side surface A first array of conductive traces is supported at the first side surface and a second array of conductive traces supported at the second side surface. Each conductive trace includes a proximal conductive pad proximate to the proximal end of the actuator arm, a distal conductive pad proximate to the distal end of the actuator arm and a conductive path between the proximal and distal conductive pads. The head gimbal assembly includes a load beam having a base region abutting the actuator arm, a head coupled to the load beam, first and a second array of base region conductive pads, each array of base region conductive pads positioned on the base region and for electrically connecting to the head. Distal solder structure electrically connects the first array of base region conductive pads to corresponding distal conductive pads of the first array of conductive traces and electrically connect the second array of base region conductive pads to corresponding distal conductive pads of the second array of conductive traces. The distal solder structure provides a mechanical joint sufficient to support the weight of the head gimbal assembly.

18 Claims, 5 Drawing Sheets

HDD HEAD STACK ASSEMBLY HAVING CONDUCTIVE TRACES SUPPORTED BY THE SIDES OF THE ACTUATOR ARM TO EXTEND IN PLANAR ARRAYS

BACKGROUND OF THE INVENTION

1. Field of the Invention

The present invention relates to a disk drive, and more particularly to a magnetic hard disk drive ("HDD") having a head stack assembly including an actuator arm having integral conductors rigidly affixed to the sides thereof and a head gimbal assembly attached to the actuator arm without a swage plate.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A "rotary" or "swing-type" actuator assembly comprises a body portion that rotates on a pivot bearing cartridge between limited positions, a coil portion that extends from one side of the body portion to interact with one or more permanent magnets to form a voice coil motor, and an actuator arm that extends from an opposite side of the body portion to support the HGA.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

Signals induced on the head, during read and write operations, must be carried to the proximal end of the HSA, where the flex cable assembly is attached. Typically, discrete conductors attached to the sides of the actuator arm are used. Such discrete conductors conventionally include conducting wires surrounded by insulating tubes. Electrically connecting these discrete conductors and attaching them to the sides of the HSA has traditionally been a painstaking manual process, which not only adds to the overall manufacturing cost of the HSA, but also increases the probability of introducing manufacturing defects therein, thereby decreasing the reliability of the resultant disk drive.

One prior art solution to the problems associated with the use of discrete conductors, as described above, is to use an actuator arm flex circuit which includes vertically spaced-art conductive traces for carrying signals to or from a head in a prior art disk drive. The arm flex circuit is supported on only one side surface of a corresponding actuator arm and extends along the length of the actuator arm such that conductive pads ("proximal conductive pads") positioned near a body portion of a head stack assembly mate, via solder bumps, with corresponding conductive pads ("main flex conductive pads") on a main flex circuit. The main flex circuit is positioned between the arm flex circuit and the body portion. The conductive traces include conductive pads ("distal conductive pads") which mate, via solder bumps, with corresponding conductive pads ("base region conductive pads") positioned on a load beam. The solder bumps serve to electrically connect the distal conductive pads and the base region conductive pads such that the head and electrical components on the main flex circuit are electrically interconnected. However, a swage plate is attached to the load beam such that the load beam is attached to the actuator arm by a swaging technique to be described below.

Conventionally, the HGA is attached to the actuator arm via a swage plate, also called a nut plate. A swage plate is a thin metallic plate including a circular bore that extends into a short cylinder. The cylinder of the swage plate is introduced through corresponding mating holes near the proximal end of the HGA and the distal end of the actuator arm; the swage plate, HGA and actuator arm thereby assuming a stacked configuration. Thereafter, a swage ball, also called a nut ball, is forced through the cylinder. As the diameter of the swage ball is slightly larger than the internal diameter of the cylinder of the swage plate, the inner walls of the cylinder expand somewhat forcing the outer walls of the cylinder to interfere with the corresponding mating hole in the actuator arm, thereby securing the swage plate, HGA and actuator arm together. However, securing the HGA to the actuator arm via a swage or nut plate adds additional weight to the HSA, which translates into greater inertia of the HSA and slower drive access times. Moreover, such a swaging technique is complex and requires several precise manufacturing steps, thus adding to the total cost of the HSA, one of the costliest elements of the disk drive to manufacture.

SUMMARY OF THE INVENTION

The invention can be regarded as a head stack assembly for a disk drive, the head stack assembly comprising a body portion, a main flex circuit, an actuator arm cantilevered from the body portion and a head gimbal assembly supported at the actuator arm. The body portion includes a bore defining a pivot axis and a mounting site. The main flex circuit includes a mounting portion supported at the mounting site. The actuator arm includes a proximal end and a distal end, a first side surface and a second side surface, each side surface being substantially parallel to the pivot axis. A first array of conductive traces is supported at the first side surface and a second array of conductive traces is supported at the second side surface, each array of conductive traces defining a vertical plane substantially parallel to the pivot axis. Each conductive trace includes a proximal conductive pad proximate to the proximal end of the actuator arm, a distal conductive pad proximate to the distal end of the actuator arm and a conductive path between the proximal and distal conductive pads. The head gimbal assembly includes a load beam having a base region abutting the actuator arm, a head coupled to the load beam, a first array of base region conductive pads and a second array of base region conductive pads, each array of base region conductive pads positioned on the base region and for electrically connecting to the head. Distal solder means electrically connect the first array of base region conductive pads on the head gimbal assembly to corresponding distal conductive pads of the first array of conductive traces supported on the first side surface of the actuator arm and electrically connect the second array of base region conductive pads on the head gimbal assembly to corresponding distal conductive pads of the second array of conductive traces supported on the second side surface of the actuator arm. The distal solder means provide a mechanical joint sufficient to support the weight of the head gimbal assembly.

The invention can also be regarded as a disk drive comprising a base, a cover attached to the base, a spindle motor attached to the base, a disk mounted to the spindle motor and a head stack assembly coupled to the base. The head stack assembly includes a body portion, a main flex circuit, an actuator arm cantilevered from the body portion and a head gimbal assembly supported at the actuator arm. The body portion includes a bore defining a pivot axis and a mounting site. The main flex circuit includes a mounting portion supported at the mounting site. The actuator arm includes a proximal end and a distal end, a first side surface and a second side surface, each side surface being substantially parallel to the pivot axis. A first array of conductive traces is supported at the first side surface and a second array of conductive traces is supported at the second side surface, each array of conductive traces defining a vertical plane substantially parallel to the pivot axis. Each conductive trace includes a proximal conductive pad proximate to the proximal end of the actuator arm, a distal conductive pad proximate to the distal end of the actuator arm and a conductive path between the proximal and distal conductive pads. The head gimbal assembly includes a load beam having a base region abutting the actuator arm, a head coupled to the load beam, a first array of base region conductive pads and a second array of base region conductive pads, each array of base region conductive pads positioned on the base region and for electrically connecting to the head. Distal solder means electrically connect the first array of base region conductive pads on the head gimbal assembly to corresponding distal conductive pads of the first array of conductive traces supported on the first side surface of the actuator arm and electrically connect the second array of base region conductive pads on the head gimbal assembly to corresponding distal conductive pads of the second array of conductive traces supported on the second side surface of the actuator arm. The distal solder means provide a mechanical joint sufficient to support the weight of the head gimbal assembly.

DETAILED DESCRIPTION OF THE PREFERRED EMBODIMENTS

Figure 1:
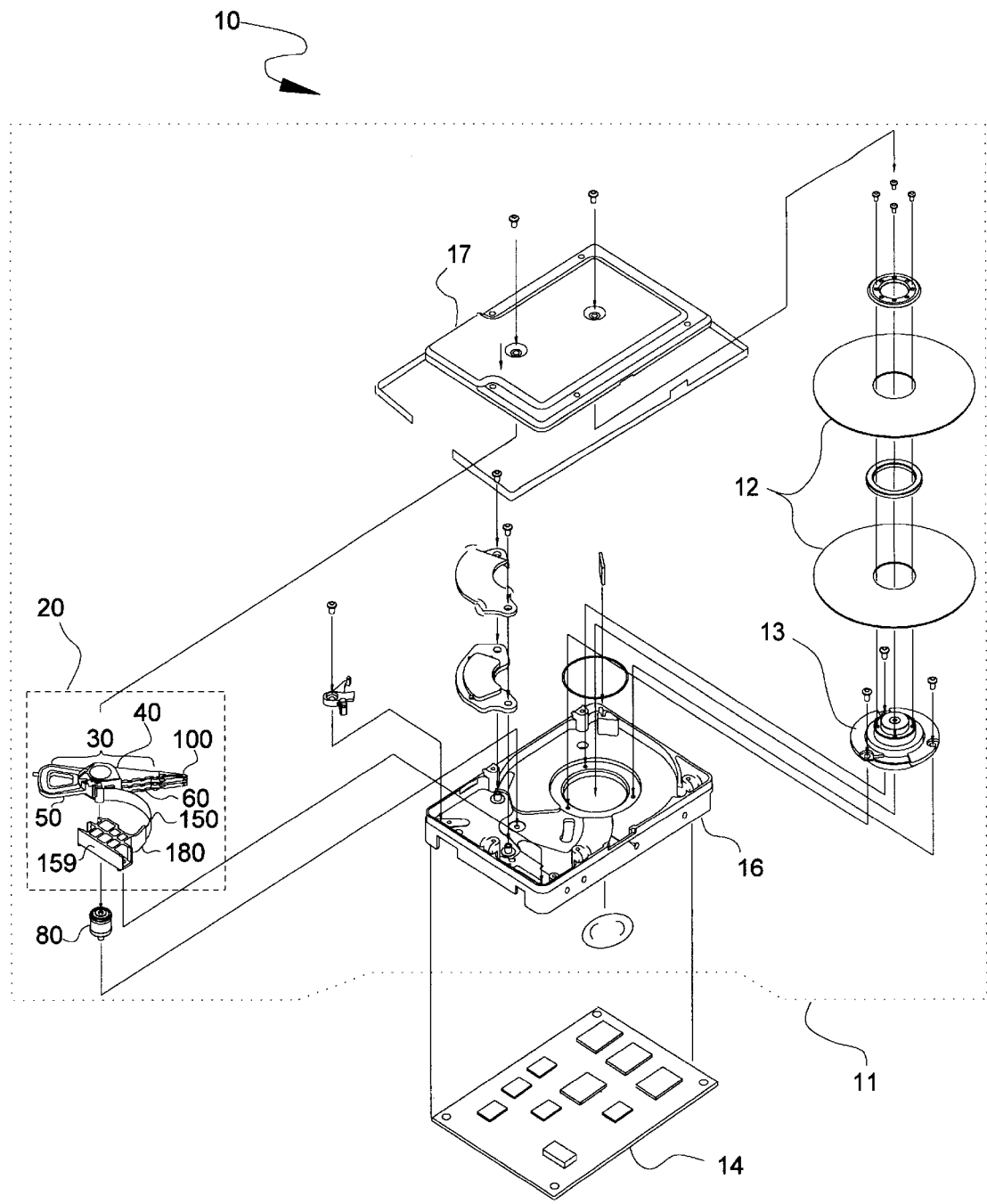
FIG. 1 is an exploded perspective view of a magnetic hard disk drive including a head stack assembly according to the present invention.

FIG. 1 shows the principal components of a disk drive such as a magnetic hard disk drive 10 constructed in accordance with this invention. With reference to FIG. 1, the preferred disk drive 10 is an integrated drive electronics (IDE) drive comprising an HDA 11 and a PCBA 14.

The HDA 11 includes a base 16 and a cover 17 attached to the base 16 that collectively house a magnetic disk 12 (two shown), a spindle motor 13 attached to the base 16 for rotating the mounted disk 12, a head stack assembly 20, and a pivot bearing cartridge 80, such as a stainless steel pivot bearing cartridge, that rotatably supports the HSA 20 on the base 16. Preferably, the spindle motor 13 rotates the disk 12 at a constant angular velocity. The preferred head stack assembly 20 comprises a swing-type or rotary actuator assembly 30, at least one head gimbal assembly 100, and a flex circuit cable assembly 180. The rotary actuator assembly 30 includes a body portion 40, at least one actuator arm 60 cantilevered from the body portion 40, and a coil portion 50 cantilevered from the body portion 40 in an opposite direction from the actuator arm 60. The actuator arm 60 supports the head gimbal assembly 100 with a head located at its far end that is biased toward and moveable over the disk 12. The flex cable assembly 180 includes a flex circuit cable 150 and a flex clamp 159. The head stack assembly 20 is pivotally secured to the base 16 via the pivot bearing cartridge 80 so that the head at the distal end of the head gimbal assembly 100 may be moved over a recording surface of the disk 12. The storage capacity of the HDA 11 may be increased, as shown in FIG. 1, by including several disks 12 and a head stack assembly 20 having a vertical "stack" of head gimbal assemblies 100 supported by multiple actuator arms 60.

Figure 2:
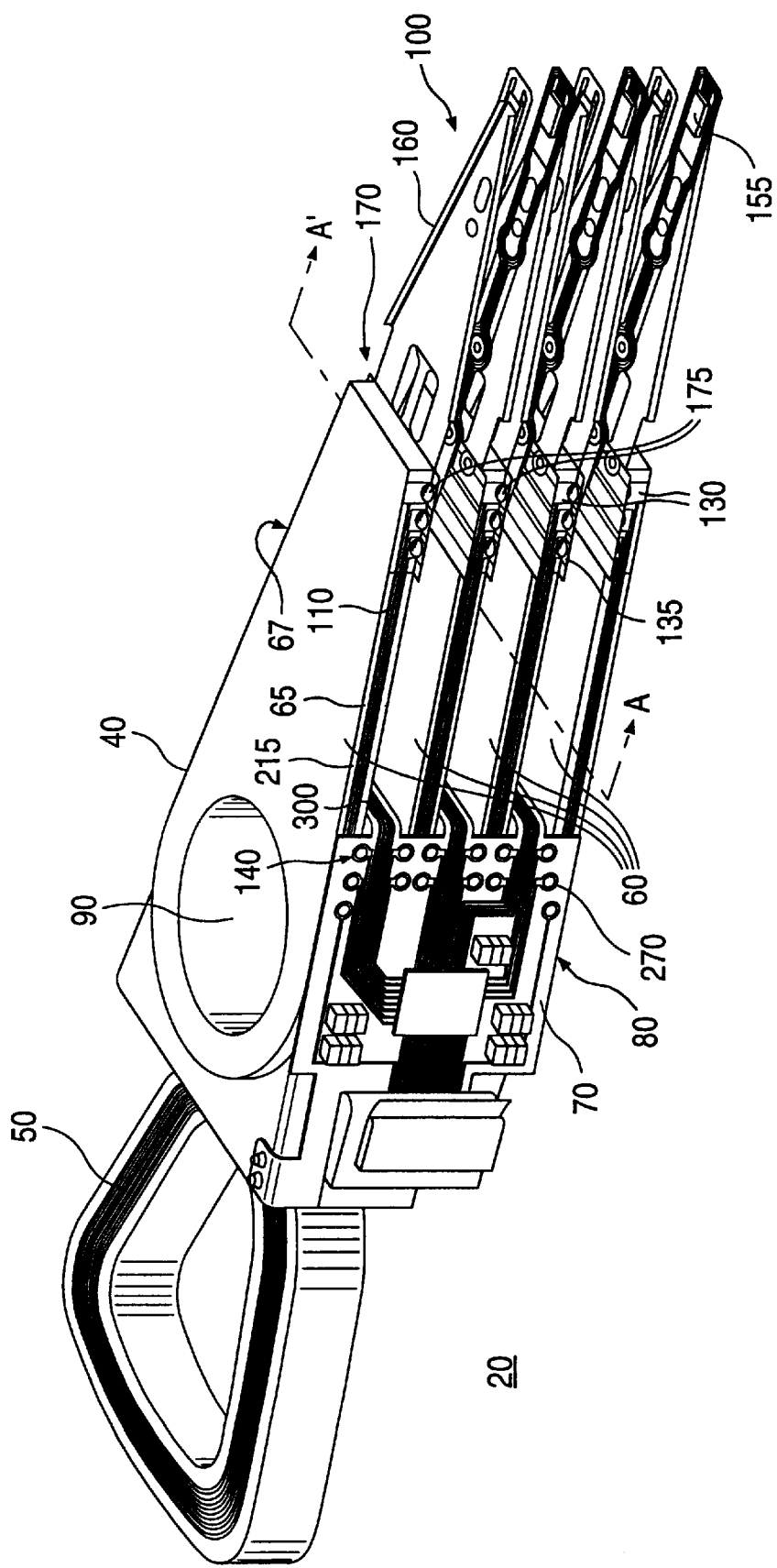
FIG. 2 is a perspective view of the HSA according to the present invention.
Figure 3:
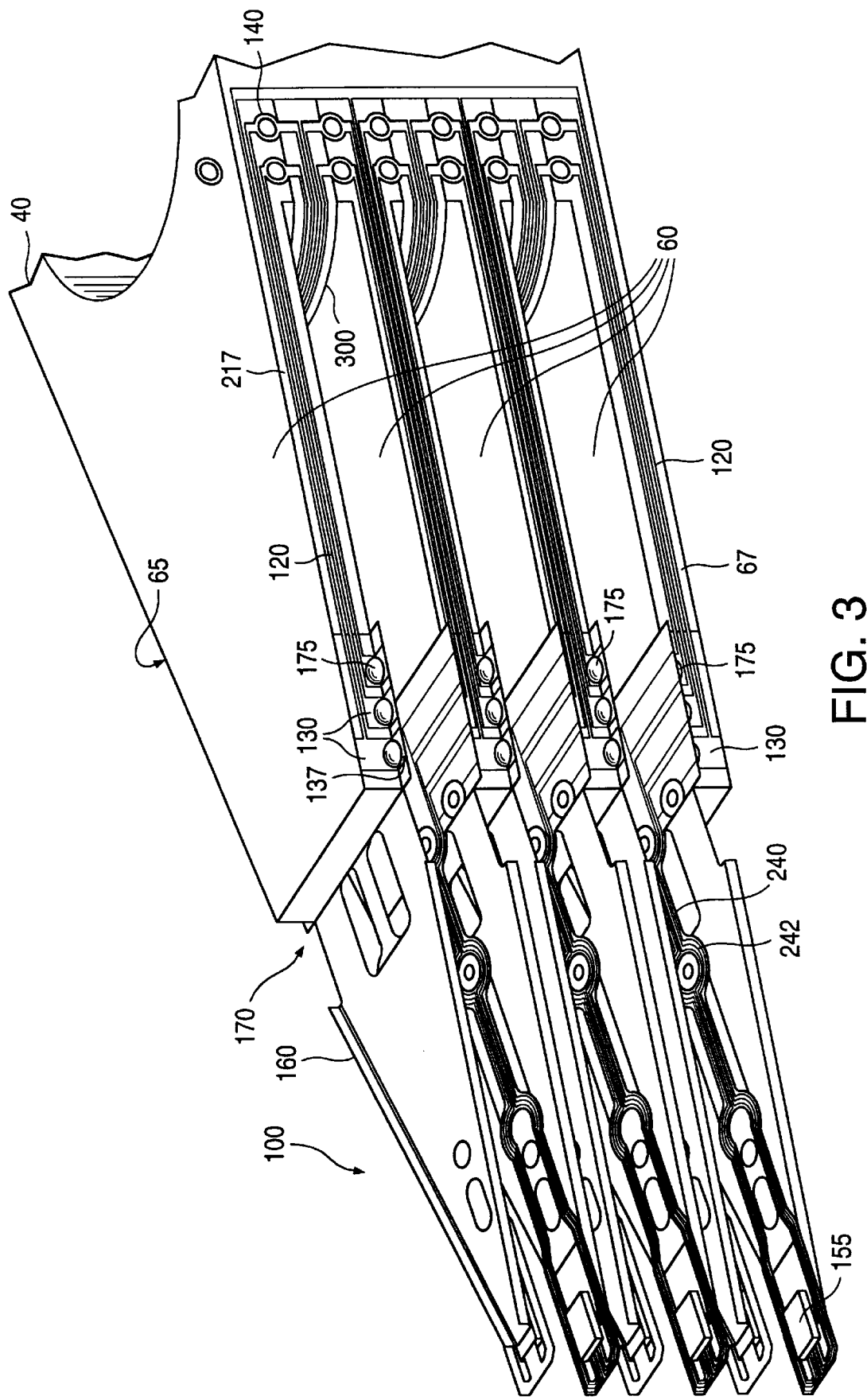
FIG. 3 is perspective view of the actuator arms of the HSA according to the present invention.

FIGS. 2 and 3 are perspective views of the HSA 20 according to the present invention. FIG. 2 shows the HSA 20 in substantially the orientation of the HSA 20 shown in FIG. 1, whereas FIG. 3 shows another perspective view of the actuator arms 60 and HGA 100 of the HSA 20, illustrating surfaces and features that are hidden in FIG. 1.

As shown in FIG. 2, the head stack assembly 20 includes a body portion 40, a main flex circuit 70 including main flex conductive pads 270 which mate with corresponding proximal conductive pads (generally indicated by 140 in FIG. 2) of conductive traces, to be described in more detail below, at least one actuator arm 60 and a head gimbal assembly 100. The body portion 40 includes a bore 90 defining a pivot axis. The body portion 40 also defines a mounting site 80 onto which the main flex circuit 70 is mounted. Each of the actuator arms 60 is cantilevered from the body portion 40 and includes a first side surface 65 (best seen in FIG. 2) and a second side surface 67 (best seen in FIG. 3). The first side surface 65 and the second side surface 67 are substantially parallel to a pivot axis defined by the bore 90 of the body portion 40. For ease and uniformity of description, the proximal end of an actuator arm 60 is defined as that end thereof which is closest to the bore 90, whereas the distal end of an actuator arm 60 is defined as that end thereof which is closest to the HGA 100.

Instead of utilizing conventional discrete conductors, the present invention, as shown in FIG. 2, preferably includes a first array of conductive traces 110 supported at the first side surface 65 of each of the actuator arms 60 via a first actuator arm flex circuit 215. Likewise, as shown in FIG. 3, a second array of conductive traces 120 is supported at the second side surface 67 of each of the actuator arms 60 via a second actuator arm flex circuit 217. The first and second arrays of conductive traces 110, 120 define vertical planes that are substantially parallel to the pivot axis defined by the bore 90. Each of the conductive traces of the first and second arrays of conductive traces 110, 120 includes a proximal conductive pad 140 (best seen in FIGS. 3 and 5) proximate to the proximal end of its respective actuator arm 60. Similarly, each of the conductive traces of the first and second arrays of conductive traces 110, 120 includes a distal conductive pad 130 (best seen in FIG. 3) proximate to the distal end of its respective actuator arm 60. A conductive path is disposed between each corresponding proximate and distal conductive pad 140, 130.

As shown in FIG. 3, the HGA 100, according to the present invention, includes a load beam 160 having a base region 170 abutting the distal end of the actuator arm 60. A read-write head 155, also called a slider, is coupled to the load beam 160. The head gimbal assembly 100 includes a gimbal layer 240 attached thereto. The gimbal layer 240 includes an array of conductive leads 242 connected to the head 155. The HGA 100 also includes a first array of base region conductive pads 135 as seen in FIG. 2 and a second array of base region conductive pads 137 as seen in FIG. 3, each positioned on the base region. Each conductive lead of the array of conductive leads 242 of the gimbal layer 240 is electrically connected to a respective base region conductive pad of the first and second array of base region conductive pads 135 and 137.

Figure 4:
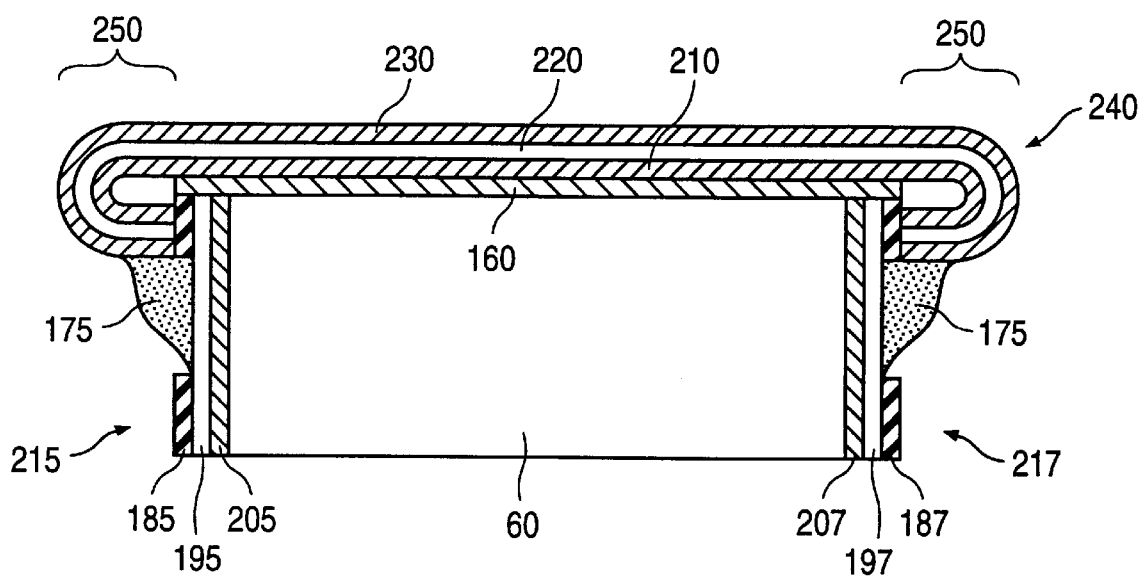
FIG. 4 is a cross-sectional view of the attachment of an HGA to an actuator arm, according to an embodiment of the present invention.

As shown in FIGS. 3 and 4, distal solder means 175 electrically connect the constituent base region conductive pads of the first array of base region conductive pads 135 to corresponding distal conductive pads of the first array of conductive traces 110 (FIG. 2). Likewise, distal solder means 175 electrically connect the constituent base region conductive pads of the second array of base region conductive pads 137 to corresponding distal conductive pads of the second array of conductive traces 120. Therefore, the head 155 is electrically connected to the proximal conductive pads of the first and second arrays of conductive traces 110, 120 via the conductive leads 242 of the gimbal layer 240, the first and second base region conductive pads 135, 137, the distal solder means 175, the distal conductive pads of the first and second array of conductive traces 110, 120 and via the first and second distal conductive traces 110, 120.

The distal solder means 175 not only provide an electrical connection between the conductive leads 242 of the gimbal layer 240 and the first and second array of conductive traces 110, 120, but the distal solder means 175 also provide a mechanical joint that is sufficient to support the weight of the head gimbal assembly 100. Indeed, the distal solder means 175, according to a preferred embodiment of the present invention, collectively provide the only mechanical joint between the HGA 100 and the actuator arm 60, obviating the need for a swage plate and the manufacturing steps and cost associated therewith. The structure of the load beam 160, gimbal layer 240 and of the actuator arm 60 allowing such an electrical-mechanical connection via the distal solder means 175 is shown in the FIG. 4.

FIG. 4 is a cross-sectional view of the base region 170 of the HGA 100 and of the distal portion of the actuator arm 60, taken along line AA' in FIG. 2. The gimbal layer 240 preferably includes a first metallic layer 210 and a second metallic layer 230. The first metallic layer 210 is attached to the load beam 160. For example, the gimbal layer 240 may be attached to the load beam 160 via welds attaching the first metallic layer 210 to the load beam 160. Other attachment means between the load beam 160 and the first metallic layer 210 are possible, and all such means are deemed to fall within the scope of the present invention. The second metallic layer 230 is attached to the actuator arm 60 by the distal solder means 175. The first metallic layer 210 and the second metallic layer 230 are preferably separated by an insulating layer 220. According to preferred embodiments of the present invention, the first metallic layer 210 may include stainless steel and the second metallic layer 230 may include a low resistivity metal such as copper. Insulating layer 220 may include polyimide, for example.

As shown in FIG. 4, the gimbal layer 240 includes a folded portion 250 proximate the base region 170 that extends beyond the load beam 160 in a direction that is perpendicular to the longitudinal axis of the load beam 160. The folded portions 250 of the gimbal layer 240 form the first array of base region conductive pads 135 and the second array of base region conductive pads 137. The second metallic layer 230 and the underlying insulating layer 220 and the first metallic layer 210 therefore, are folded over onto themselves so the second metallic layer 230 presents a conducting surface to the distal solder means 175, to form the first and second arrays of base region conductive pads 135, 137. The first actuator arm flex circuit 215 may be supported at the first side surface 65. The first array of conductive traces 110 may be supported at the first actuator arm flex circuit 215. Likewise, the second actuator arm flex circuit 217 may be supported at the second side surface 67. The second array of conductive traces 120 may be supported at the second actuator arm flex circuit 217. The first and second actuator arm flex circuits 215, 217 may include a laminate structure, including an insulating base layer 205, 207 bonded or otherwise attached to the first and second side surface 65, 67, respectively, of the actuator arm 60. In an alternative embodiment, the first and second actuator arm flex circuits 215, 217 may be attached to respective side surfaces of the actuator arm 60 by an injection molding process. Suitably, the actuator arm flex circuits may be positioned in a mold cavity along with other components of a head stack assembly and a thermoplastic material, preferably non-conductive, may be injected into the mold cavity to form the actuator arms and the body portion. In addition, the plastic structure of the coil portion 50 (FIG. 2) may be formed at the same time as the actuator arms and the body portion. In yet another alternative embodiment, the conductive traces may be formed on respective side surfaces of the actuator arm 60 by a plating process.

Continuing with FIG. 4, a conductive layer 195, 197 may be disposed on the insulating base layer 205, 207, respectively, and an insulating cover layer 185, 187 may be disposed on the conductive layer 195, 197, respectively. According to preferred embodiments of the present invention, the insulating base layers 205, 207 may include polyimide, the conductive layers 195, 197 may include a low resistivity metal such as copper, and the cover layers 185, 187 may include polyimide. To allow the distal solder means 175 to make electrical and mechanical contact with the conductive layers 195 and 197, the cover layers 185, 187 preferably include openings to expose the underlying metallic layers 195 and 197. In practice, the distal solder means 175 may be mated to the first and second arrays of base region conductive pads 135, 137. Thereafter, alignment may be adjusted by the machinery holding the actuator arm 60 and the HGA 100, and hot nitrogen gas may be directed at the distal solder means 175, causing the distal solder means 175 to reflow onto its corresponding distal conductive pad 130. Instead of hot nitrogen gas, focused infrared radiation may be employed, or some other heating and reflow means.

Figure 5:
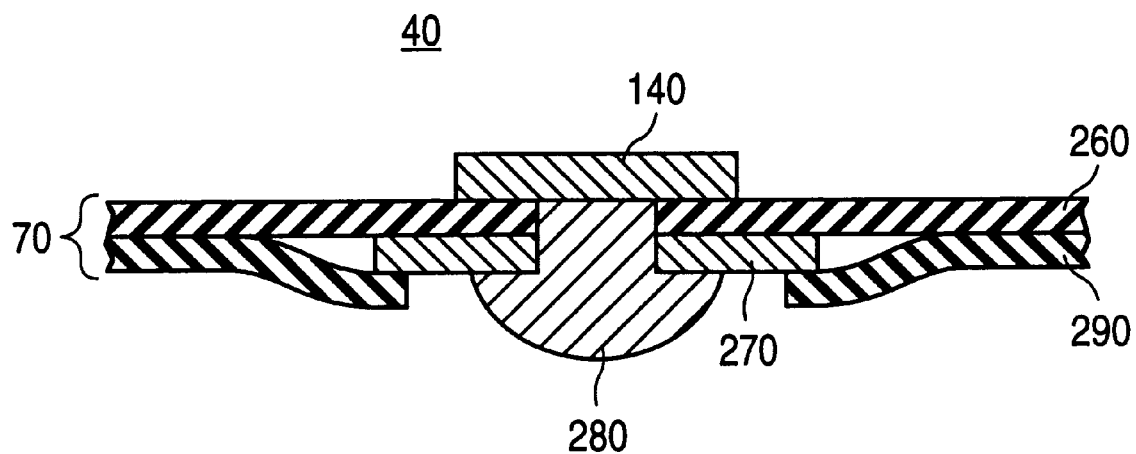
FIG. 5 is a cross-sectional view of a proximate conductive pad, and the manner in which it attaches to the main flex circuit, according to an embodiment of the present invention.

As shown in FIG. 5, the main flex circuit, shown at reference numeral 70 in FIG. 2, preferably includes a base insulating layer 260 and a respective main flex conductive pad 270 aligned over each of the proximal conductive pads 140. As shown, the proximal conductive pad 140 is positioned between the body portion, generally indicated by 40, of the head stack assembly and the main flex circuit 70. The base insulating layer 260 and the flex circuit conductive pads 270 each include openings exposing a portion of an underlying proximal conductive pad 140. Proximal solder means 280 are then disposed within the openings, to electrically connect the flex circuit conductive pad 270 to the underlying proximal conductive pad 140. The main flex circuit 70 preferably includes an insulating cover layer 290 disposed over the base insulating layer 260 and the flex circuit conductive pad 270, the insulating cover layer 290 including an opening aligned with the flex circuit conductive pad 270 to accommodate the proximal solder means 280. In this manner, a reliable electrical contact is made between the proximal conductive pad 140 and the flex circuit conductive pad 270, thereby electrically connecting the head 155 (FIG. 2 or 3) to the main flex circuit 70.

As shown in FIGS. 2 and 3, transversal flex cables 300 connect the proximal conductive pads of the second array of conductive traces 120 to the flex circuit 70, utilizing a similar attachment means as that illustrated in FIG. 5. According to the present invention, the proximate conductive pads and the flex circuit conductive pads 270 may include low resistivity metal, such as copper. Moreover, the base insulating layer 260 and the cover layer 290 may include polyimide.

Significantly, the present invention reduces the inertia of the HSA 20 by eliminating the swage plate as well as the use of discrete conductors to carry the signals induced on the head 155 to the main flex circuit 70. This reduction in inertia, in turn, leads to faster access times and/or lower acoustic performance. Moreover, the elimination of the swage plate and the discrete wires reduces the assembly time and costs of manufacturing, by eliminating complex manufacturing steps.

I claim:

1. A head stack assembly for a disk drive, the head stack assembly comprising:
    a body portion including a bore defining a pivot axis and a mounting site;
    a main flex circuit having a mounting portion supported at the mounting site;
    an actuator arm cantilevered from the body portion and including:
        a first side surface and a second side surface, each side surface being substantially
        parallel to the pivot axis,
        a proximal end and a distal end;
    a first array of conductive traces supported at the first side surface;
    a second array of conductive traces supported at the second side surface;
    each array of conductive traces defining a vertical plane substantially parallel to the pivot axis;
    each conductive trace including:
        a proximal conductive pad proximate to the proximal end of the actuator arm;
        a distal conductive pad proximate to the distal end of the actuator arm;
    a conductive path between the proximal and distal conductive pads;
    a head gimbal assembly supported at the actuator arm and including:
        a load beam having a base region abutting the actuator arm;
        a head coupled to the load beam;
        a first array of base region conductive pads and a second array of base region conductive pads, each array of base region conductive pads positioned on the base region and for electrically connecting to the head; and
        distal solder means for electrically connecting the first array of base region conductive pads to corresponding distal conductive pads of the first array of conductive traces and for electrically connecting the second array of base region conductive pads to corresponding distal conductive pads of the second array of conductive traces, wherein the distal solder means provides a mechanical joint sufficient to support the weight of the head gimbal assembly.

2. The head stack assembly of claim 1, wherein the head gimbal assembly further comprises a gimbal layer, the gimbal layer including an array of conductive leads, each conductive lead connecting the head to a respective base region conductive pad of the first and second arrays of base region conductive pads.

3. The head stack assembly of claim 2, wherein the gimbal layer comprises a first and a second metallic layer separated by an insulating layer, wherein the first metallic layer is attached to the load beam and wherein the second metallic layer is attached to the actuator arm by the distal solder means.

4. The head stack assembly of claim 3, wherein the first metallic layer comprises stainless steel and the second metallic layer comprises copper.

5. The head stack assembly of claim 3, wherein the insulating layer comprises polyimide.

6. The head stack assembly of claim 1, further comprising:
    a first actuator arm flex circuit supported at the first side surface, the first array of conductive traces supported by the first arm flex circuit; and
    a second actuator arm flex circuit supported at the second side surface, the second array of conductive traces supported by the second arm flex circuit.

7. The head stack assembly of claim 2, wherein the gimbal layer includes a folded portion proximate to the base region and extending beyond the load beam in a direction perpendicular to a longitudinal axis of the load beam, the folded portion forming the first and second arrays of base region conductive pads.

8. The head stack assembly of claim 1, wherein the main flex circuit comprises a base insulating layer and a respective flex circuit conductive pad aligned over each of the proximal conductive pads, wherein the base insulating layer and the flex circuit conductive pads each include openings exposing a portion of an underlying proximal conductive pad, and wherein proximal solder means electrically connect each flex circuit conductive pad with a corresponding underlying proximal conductive pad.

9. The head stack assembly of claim 8, wherein the main flex circuit includes an insulating cover layer disposed over the base insulating layer and the flex circuit conductive pads, the insulating cover layer including openings aligned with the flex circuit conductive pads to accommodate the proximal solder means.

10. A disk drive comprising:
    a housing including a base;
    a spindle motor attached to the base;
    a disk mounted to the spindle motor;
    a head stack assembly coupled to the base comprising:

a body portion including a bore defining a pivot axis and a mounting site;

a main flex circuit having a mounting portion supported at the mounting site;

an actuator arm cantilevered from the body portion and including:
- a first side surface and a second side surface, each side surface being substantially parallel to the pivot axis;
- a proximal end and a distal end;

a first array of conductive traces supported at the first side surface;

a second array of conductive traces supported at the second side surface, each array of conductive traces defining a vertical plane substantially parallel to the pivot axis;

each conductive trace including:
- a proximal conductive pad proximate to the proximal end of the actuator arm;
- a distal conductive pad proximate to the distal end of the actuator arm;
- a conductive path between the proximal and distal conductive pads;

a head gimbal assembly supported at the actuator arm and including:
- a load beam having a base region abutting the actuator arm;
- a head coupled to the load beam;
- a first array of base region conductive pads and a second array of base region conductive pads, each array of base region conductive pads positioned on the base region and for electrically connecting to the head; and
- distal solder means for electrically connecting the first array of base region conductive pads to corresponding distal conductive pads of the first array of conductive traces and for electrically connecting the second array of base region conductive pads to corresponding distal conductive pads of the second array of conductive traces, wherein the distal solder means provides a mechanical joint sufficient to support the weight of the head gimbal assembly.

11. The disk drive of claim 10, wherein the head gimbal assembly further comprises a gimbal layer, the gimbal layer including an array of conductive leads, each lead connecting the head to a respective base region conductive pad of the first and second arrays of base region conductive pads.

12. The disk drive of claim 11, wherein the gimbal layer comprises a first and a second metallic layer separated by an insulating layer, wherein the first metallic layer is attached to the load beam and wherein the second metallic layer is attached to the actuator arm by the distal solder means.

13. The disk drive of claim 12, wherein the first metallic layer comprises stainless steel and the second metallic layer comprises copper.

14. The disk drive of claim 12, wherein the insulating layer comprises polyimide.

15. The disk drive of claim 10, further comprising:
- a first actuator arm flex circuit supported at the first side surface, the first array of conductive traces supported by the first arm flex circuit; and
- a second actuator arm flex circuit supported at the second side surface, the second array of conductive traces supported by the second arm flex circuit.

16. The disk drive of claim 11, wherein the gimbal layer includes a folded portion proximate to the base region and extending beyond the load beam in a direction perpendicular to a longitudinal axis of the load beam, the folded portion forming the first and second arrays of base region conductive pads.

17. The disk drive of claim 10, wherein the main flex circuit comprises a base insulating layer and respective flex circuit conductive pads aligned over each of the proximal conductive pads, wherein the base insulating layer and the flex circuit conductive pads each include openings exposing a portion of an underlying proximal conductive pad, and wherein proximal solder means electrically connect each flex circuit conductive pad with a corresponding underlying proximal conductive pad.

18. The disk drive of claim 17, wherein the main flex circuit includes an insulating cover layer disposed over the base insulating layer and the flex circuit conductive pads, the insulating cover layer including openings aligned with the flex circuit conductive pads to accommodate the proximal solder means.

* * * * *